Patented Nov. 12, 1935

2,020,345

UNITED STATES PATENT OFFICE 2,020,345

SULPHUR DYE AND METHOD FOR ITS PREPARATION

Max Wyler, Blackley, England, assignor to Imperial Chemical Industries Limited, a corporation of Great Britain No Drawing. Application February 1, 1933, Serial No. 654,763. In Great Britain February 1, 1932

18 Claims. (Cl. 260—19)

This invention relates to new sulfur dyes and processes whereby they are prepared, and more particularly refers to sulfur dyes prepared by reacting a compound having the following general formula:

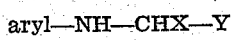
aryl—NH—CHX—Y wherein aryl represents an aryl radical having a free para position, X represents a hydrogen, alkyl or aryl radical and Y represents a —CN, —$CONH_2$ or $CSNH_2$ radical, with a nitrosophenol, quinone-chlorimide or an aminophenol, then thionating the resulting product or its leuco derivative and isolating the so-obtained sulfur dye.

According to the present invention new indophenols are produced by reacting the compound having the general formula:

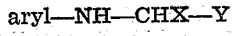
aryl—NH—CHX—Y with nitrosophenol, quinone-chlorimide or aminophenol. The intermediate products thus obtained, correspond most probably to the general formula:

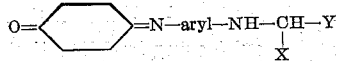

wherein "aryl", X and Y have the same significance as above. These indophenols or their leuco derivatives may then be thionated in the customary manner to produce valuable new sulfur dyes having shades varying from greenish-blue to violet-blue.

The invention may be more thoroughly understood by a consideration of the following illustrative examples in which the quantities are stated in parts by weight:

Example 1

15 parts of anilinoacetamide,

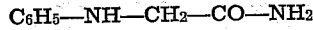
$C_6H_5$—NH—$CH_2$—CO—$NH_2$ were dissolved in 200 parts of 85% sulfuric acid and 12.3 parts of p-nitrosophenol were added at 10–15° C. The solution was stirred for one hour and then poured into an ice-cold aqueous solution of 250 parts of sodium carbonate. The precipitate was filtered off and washed free from water-soluble matter. The so-obtained purple colored paste of indophenol was used directly for conversion into a sulfur dyestuff.

Alternatively it was reduced with sodium sulfide and precipitated with sodium bicarbonate as the leuco indophenol, a grayish-white crystalline substance, isolated in the form of a paste.

Conversion to the sulfur dyestuff was carried out as follows. To 70 parts of crystallized sodium sulfide 30 parts of sulfur were added and the mixture was fused to give a polysulfide melt. The paste of leuco indophenol produced as described above was added and the mixture was evaporated until the boiling temperature was 112° C. It was then boiled under a reflux condenser for 12 hours. The deep blue solution was diluted with water and the dyestuff was precipitated by passing a current of air through the solution.

The dry dyestuff was a dark blue powder. It dyed cotton from a sulfide bath in the usual way with outstanding evenness, a bright indigo-blue shade of excellent fastness to light and hot soaping.

Example 2

16 parts of o-toluidinopropionitrile,

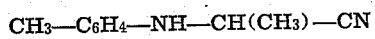
$CH_3$—$C_6H_4$—NH—CH($CH_3$)—CN were treated as described in Example 1 with 12.3 parts of p-nitrosophenol. The sulfuric acid solution of indophenol was poured into ice-cold water, and the indophenol filtered off and washed with water until free from acid.

The indophenol paste was added to a solution of 50 parts of crystallized sodium sulfide in 200 parts of water. When reduction to the leuco indophenol was completed the product was precipitated by adding 20 parts of sodium bicarbonate. It was filtered off.

The so-obtained paste was then boiled under reflux for 20 hours at 110° C. with a polysulfide solution made from 50 parts of sodium sulfide crystals and 25 parts of sulfur.

The new dyestuff was separated in the usual way. It dyed cotton a bright blue shade, redder than that given by the product of Example 1, but of similar fastness properties.

Example 3

20.8 parts of the nitrile,

$C_6H_5$—NH—CH($C_6H_5$)—CN (obtained by interaction of aniline, benzaldehyde-bisulfite, and alkali cyanide) were dissolved in 200 parts of 80% sulfuric acid and 14.1 parts of quinone-chlorimide were gradually added at 10° C. The solution was then run into an excess of ice cold aqueous sodium carbonate. To the suspension 100 parts of sodium sulfide crystals were added. The mixture was slowly warmed to 50° C. and when reduction was completed, the leuco indophenol was separated by adding 40 parts of sodium bicarbonate. The grayish-white paste of leuco indophenol was treated with sodium polysulfide as described in the preceding example. The dyestuff obtained gave bright greenish-blue shades of similar fastness properties to those of the preceding examples.

*Example 4*

The nitrile of the formula, $$C_{10}H_7-NH-CH(CH_3)-CN$$

(from alpha-naphthylamine, acetaldehyde, and alkali cyanide), was treated in 90% sulfuric acid with p-nitrosophenol as described in Example 1. The leuco indophenol was made in the way already described. The so-obtained paste was dried at about 70° C., and the dry powder was mixed with four times its weight of sulfur. The mixture was heated at 140° C. for 12 hours. The cold powdered product was used directly as a sulfur dyestuff, or it may be purified by dissolving in sodium sulfide solution and reprecipitating by a current of air. The dyestuff dyed cotton dark blue-green.

*Example 5*

16.6 parts of the compound, $$C_6H_5-NH-CH_2-CSNH_2$$

(Berichte der deutschen Chemischen Gesellschaft, Vol. 36, p. 4303) were dissolved at 30° C. or below in 166 parts of 90% sulfuric acid and treated at 15° C. with 12.3 parts of p-nitrosophenol. The condensation being complete, the solution was poured into an excess of cold sodium carbonate solution. The precipitate was filtered off and the washed paste was added to a polysulfide mixture of 70 parts of crystallized sodium sulfide and 30 parts of sulfur, and the whole was boiled under reflux at 115° C. for 10 hours.

The so-obtained dyestuff, separated in the usual way, dyed cotton very evenly in greenish-black shades.

It is to be understood that in carrying out the process of the present invention the indophenols described herein may be produced by any of the well known methods, among which are those illustrated above. It is also to be understood that the process is subject to wide variations and modifications in its practical application, and that the conditions such as specific compounds, concentrations and temperatures may be varied within rather wide limits without departing from the scope of the present invention. In place of the compounds previously mentioned other compounds may be used wherein the group represented by X may be other well known alkyl or aryl groups.

The indophenols may be thionated directly, as previously mentioned, or they may first be reduced to the leuco derivatives according to the usual methods, and thereupon these reduced compounds may then be thionated.

The compounds produced herein are exceptionally valuable because of their excellent level dyeing properties and fastness to light and hot soaping. In addition they are quite desirable because they impart beautiful shades ranging from greenish-blue to violet-blue to the material dyed.

As many apparently widely different embodiments of this invention may be made without departing from the spirit and scope thereof, it is to be understood that I do not limit myself to the specific embodiments thereof except as defined in the appended claims.

I claim:

1. A process for producing sulphur dyes which comprises reacting a compound having the following general formula:

$$aryl-NH-CHX-Y$$

wherein aryl represents an aryl radical of the benzene or naphthalene series having a free para position, X represents hydrogen or a lower alkyl radical, and Y represents a —CN, —CONH₂ or —CSNH₂ radical, with a member selected from the group consisting of nitrosophenol, quinonechlorimide and aminophenol, then thionating the resulting product and isolating the so-obtained sulfur dye.

2. A process for producing a sulfur dye which comprises forming an indophenol from anilino-acetamide and p-nitroso-phenol, reducing the resulting indophenol, thionating the resulting leuco-indophenol, and precipitating the so-obtained sulfur dye.

3. A process for producing a sulfur dye which comprises forming an indophenol from o-toluidinopropionitrile and p-nitroso-phenol, reducing the resulting indophenol, thionating the resulting leuco-indophenol, and precipitating the so-obtained sulfur dye.

4. A process for producing a sulfur dye which comprises forming an indophenol from the nitrile obtained by the interaction of aniline, benzaldehyde-bisulfite and alkali-cyanide, and quinonechlorimide, reducing the resulting indophenol, thionating the resulting leuco-indophenol, and precipitating the so-obtained sulfur dye.

5. Sulphur dyes produced according to the process described in claim 1.

6. A sulfur dye produced according to the process described in claim 2.

7. A sulfur dye produced according to the process described in claim 3.

8. A sulfur dye produced according to the process described in claim 4.

9. The process of producing a sulfur dyestuff which comprises subjecting to thionation an indophenol compound of the general formula:

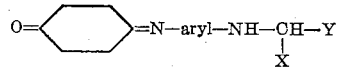

wherein aryl stands for an aryl radical of the benzene or naphthalene series having a free para position; X stands for hydrogen or a lower alkyl radical; and Y stands for the group —CN, CO·NH₂, or CS·NH₂.

10. The process of producing a sulphur dyestuff which comprises subjecting to the action of an alkali metal polysulphide a compound selected from the group consisting of the indophenol form and leuco form of a compound which in indophenol form corresponds to the general formula

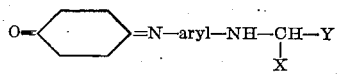

wherein aryl stands for an aryl radical of the benzene or naphthalene series having a free para position; X stands for hydrogen or a lower alkyl radical; and Y stands for the group —CN, CO·NH₂, or CS·NH₂.

11. The process of producing a sulfur dyestuff which comprises subjecting to the action of an alkali metal polysulfide an indophenol compound which, when in oxidized form, corresponds to the formula

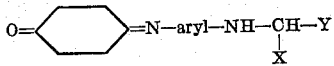

wherein aryl represents an aryl radical of the benzene series having a free para position; X stands for hydrogen or methyl; and Y stands for the group —CO·NH₂.

12. A sulfur dyestuff which is substantially identical with a compound obtainable according to the process defined in claim 9.

13. The sulfur dyestuffs obtainable by the process defined in claim 11.

14. The process of producing a sulfur dyestuff which comprises subjecting to thionation an indophenol carrying in the outer nitrogen atom a side chain having the skeletal structure

15. The sulfur dyestuffs obtainable by the process defined in claim 14.

16. The process of producing a sulfur dyestuff which comprises subjecting to thionation an indophenol carrying in the outer nitrogen atom a side chain of the formula —CHX—Y, wherein X stands for hydrogen or a lower alkyl, while Y stands for the carbamide radical CO—NH₂ or a radical which is equivalent thereto when in a sulfur melt.

17. The process of producing a sulfur dyestuff which comprises subjecting to thionation a compound selected from the group consisting of indophenols of the general formula

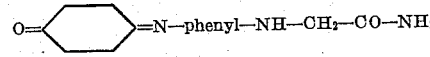

and the corresponding leuco derivatives.

18. The sulfur dyestuffs obtainable by the process defined in claim 17.

MAX WYLER.